United States Patent
Takagi et al.

(10) Patent No.: US 9,660,543 B2
(45) Date of Patent: May 23, 2017

(54) ELECTRIC POWER CONVERSION CIRCUIT SYSTEM

(71) Applicant: TOYOTA JIDOSHA KABUSHIKI KAISHA, Toyota-shi, Aichi-ken (JP)

(72) Inventors: Kenichi Takagi, Nagakute (JP);
Shuntaro Inoue, Nagakute (JP);
Takahide Sugiyama, Nagakute (JP);
Kenichiro Nagashita, Susono (JP);
Yoshitaka Niimi, Susono (JP); Masaki Okamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/064,103

(22) Filed: Mar. 8, 2016

(65) Prior Publication Data
US 2016/0285377 A1    Sep. 29, 2016

(30) Foreign Application Priority Data

Mar. 24, 2015    (JP) ................................ 2015-061061

(51) Int. Cl.
*H02M 3/335*    (2006.01)
*H02M 3/158*    (2006.01)
*H02M 1/00*    (2006.01)

(52) U.S. Cl.
CPC ....... *H02M 3/33546* (2013.01); *H02M 3/158* (2013.01); *H02M 3/33561* (2013.01);
(Continued)

(58) Field of Classification Search
CPC ......... H02M 3/33584; H02M 3/33546; H02M 3/33561; H02M 3/158; H02M 3/3376;
(Continued)

(56) References Cited

U.S. PATENT DOCUMENTS

| | | | | |
|---|---|---|---|---|
| 9,042,125 B1* | 5/2015 | Wambsganss | ...... | H02M 3/3376 363/21.02 |
| 2011/0188267 A1* | 8/2011 | Lai | ........................ | H02M 3/335 363/17 |

(Continued)

FOREIGN PATENT DOCUMENTS

| | | |
|---|---|---|
| JP | 2011-193713 A | 9/2011 |
| JP | 2014-176190 A | 9/2014 |
| WO | 2014/103105 A1 | 7/2014 |

*Primary Examiner* — Adolf Berhane
*Assistant Examiner* — Henry Lee, III
(74) *Attorney, Agent, or Firm* — Oliff PLC

(57) ABSTRACT

An electric power conversion circuit system for reducing core loss in a transformer particularly during light loading and improving conversion efficiency during light loading comprising an electric power conversion circuit composed of a primary side conversion circuit having a left arm and a right arm and a secondary side conversion circuit having a left arm and a right arm, and a control circuit for controlling switching of switching transistors of the first side conversion circuit and the secondary side conversion circuit. When the output voltage is at a relatively light load, the control circuit controls to change the duty of the transmitting side among the primary side conversion circuit and the secondary side conversion circuit and controls to change the half-bridge phase differences of the left arm and the right arm of the primary side conversion circuit and the secondary side conversion circuit, respectively.

3 Claims, 6 Drawing Sheets

(52) U.S. Cl.
CPC ... *H02M 3/33576* (2013.01); *H02M 3/33584* (2013.01); *H02M 2001/0032* (2013.01); *H02M 2001/0048* (2013.01); *Y02B 70/1491* (2013.01); *Y02B 70/16* (2013.01)

(58) Field of Classification Search
CPC ....... H02M 2001/0048; H02M 3/1582; H02M 3/33576; Y02B 70/16; Y02B 70/1491
See application file for complete search history.

(56) References Cited

U.S. PATENT DOCUMENTS

| | | | | |
|---|---|---|---|---|
| 2011/0198933 | A1* | 8/2011 | Ishigaki | B60R 25/00 307/66 |
| 2011/0249472 | A1* | 10/2011 | Jain | H02M 3/33584 363/15 |
| 2012/0320633 | A1* | 12/2012 | Chen | H02M 3/33592 363/21.01 |
| 2014/0254209 | A1 | 9/2014 | Takagi et al. | |
| 2014/0268929 | A1* | 9/2014 | Biebach | H02M 5/458 363/37 |
| 2015/0021998 | A1* | 1/2015 | Trescases | H02J 5/00 307/46 |
| 2015/0138841 | A1* | 5/2015 | Pahlevaninezhad | H02J 3/383 363/17 |
| 2015/0333634 | A1 | 11/2015 | Yoshida et al. | |

\* cited by examiner

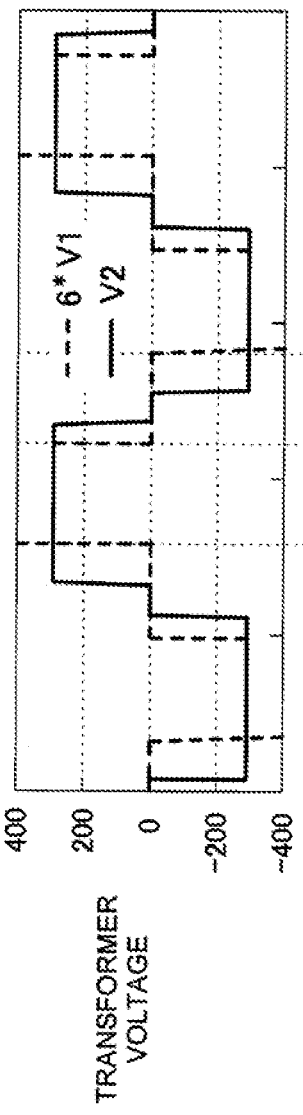
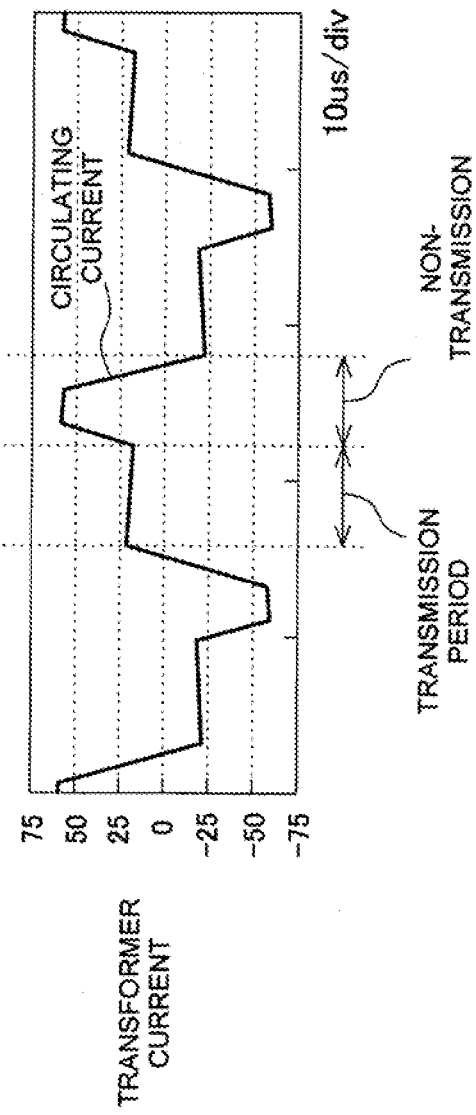
FIG. 3A
FIG. 3B

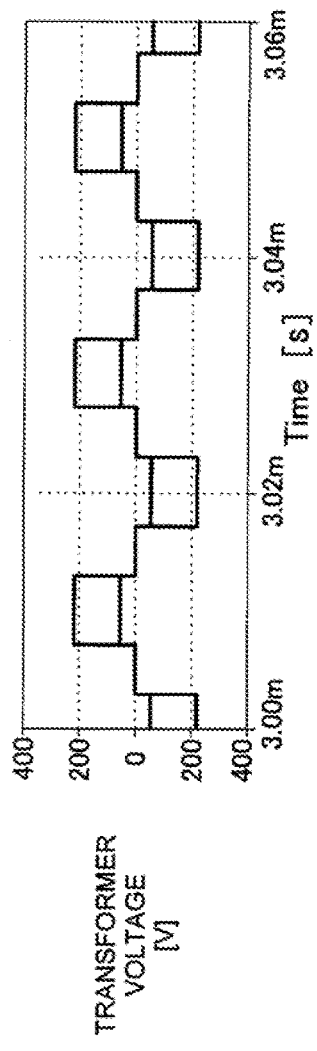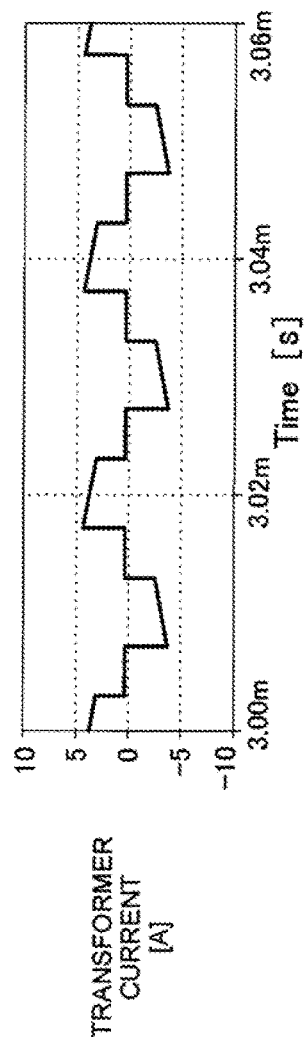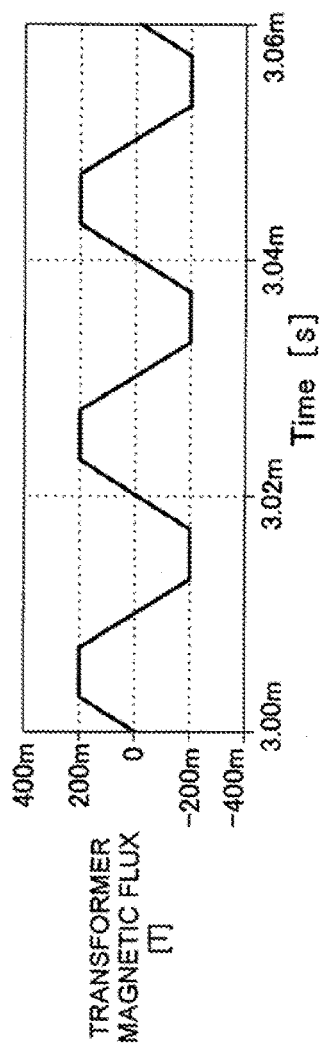
FIG. 5A
FIG. 5B
FIG. 5C

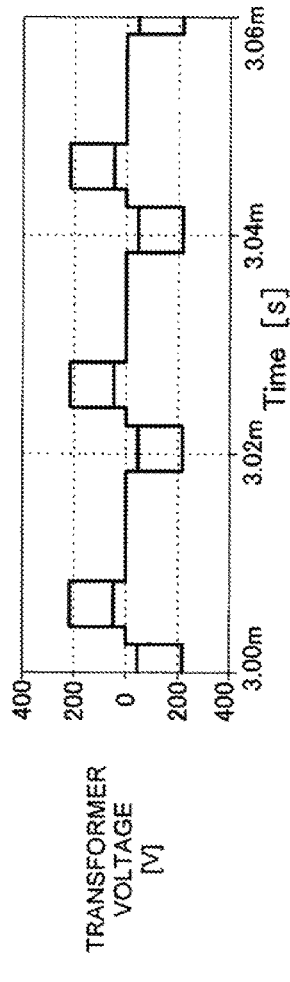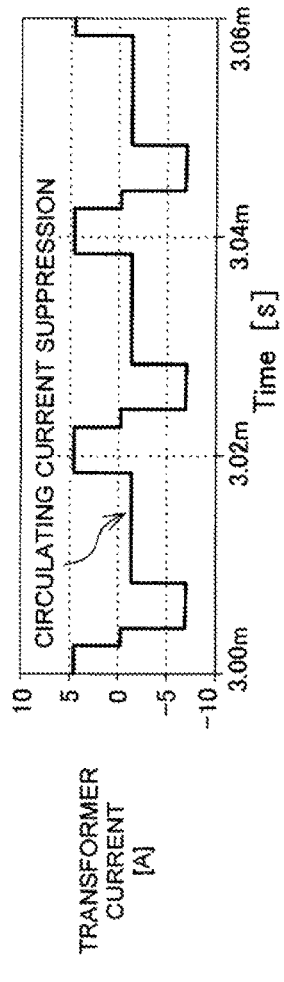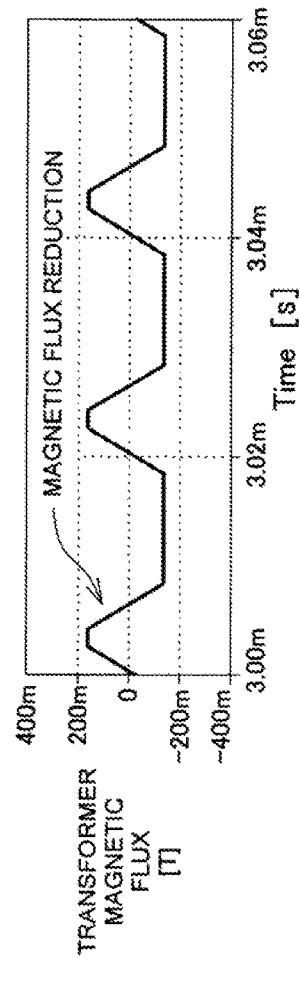

ELECTRIC POWER CONVERSION CIRCUIT SYSTEM

PRIORITY INFORMATION

This application claims priority to Japanese Patent Application No. 2015-061061, filed on Mar. 24, 2015, the entire disclosure of which is incorporated herein by reference.

FIELD

The present invention relates to an electric power conversion circuit system, and more particularly to an electric power conversion circuit system having a plurality of input/output ports.

BACKGROUND

Accompanying the development and popularization of electrically rich vehicles, such as hybrid vehicles, electric vehicles, and fuel cell vehicles, are also trends toward increasing complexity and size of in-vehicle power circuits. For example, hybrid vehicles have increasingly complex configurations including a drive battery, a system battery, a plug-in external power circuit, a DC/DC converter for supplying DC power of the drive battery to a drive motor, a DC/AC converter for converting DC power of the drive battery to AC power, a DC/DC converter for supplying DC power of the drive battery to electric power steering (EPS), a DC/DC converter for supplying DC power of the drive battery to accessories, and so forth.

Accordingly, multi-port power supplies comprising a plurality of inputs and outputs in a single circuit are being developed. Multi-port power supplies offer the miniaturization of power supply circuits through the sharing of wiring, semiconductor devices, and so forth.

JP 2011-193713 A discloses a configuration where electric power conversion is possible between selected multiple ports in an electric power conversion circuit comprising four ports. More specifically, a circuit configuration is disclosed coupling a bidirectional non-isolated chopper circuit and a bidirectional isolated converter utilizing magnetically coupled reactors and transformer.

However, in a multi-port circuit, core loss of the transformer during light loading becomes dominant and controlling this becomes essential for further improving fuel economy of hybrid vehicles. Although reducing the maximum magnetic flux density is effective in suppressing core loss of transformers, circulating current develops if only the duty is modulated and an increase in loss occurs outside the transformer.

SUMMARY

The present invention provides an electric power conversion circuit system for reducing transformer core loss particularly during light loading, thereby improving conversion efficiency during light loading.

The electric power conversion circuit system of the present invention comprises: a primary side conversion circuit comprising a left arm and a right arm between a primary side positive bus and a primary side negative bus, wherein the left arm and the right arm are respectively composed of two switching transistors connected in series, and a primary side winding of a transformer is connected to between a connecting point of the two switching transistors of the left arm and a connecting point of the two switching transistors of the right arm; a secondary side conversion circuit comprising a left arm and a right arm between a secondary side positive bus and a secondary side negative bus, wherein the left arm and the right arm are respectively composed of two switching transistors connected in series, and a secondary side winding of the transformer is connected to between a connecting point of the two switching transistors of the left arm and a connecting point of the two switching transistors of the right arm; and a control circuit for controlling switching of the switching transistors of the primary side conversion circuit and the secondary side conversion circuit. The control circuit controls, when an output voltage is at a relatively light loading, changing of a duty of a transmitting side among the primary side conversion circuit and the secondary side conversion circuit, and changing of a half-bridge phase difference of the left arm and the right arm of the primary side conversion circuit and the secondary side conversion circuit.

Transformer core loss is a dominant factor in the output voltage during relatively light loading (for example, with the output voltage at approximately 50 to 150 W), and reducing the maximum magnetic flux of the transformer is effective in reducing core loss. To reduce the maximum magnetic flux of the transformer it is necessary to shorten an excitation period of the transmitting side among the primary side conversion circuit and the secondary side conversion circuit. However, if a control is performed to change the duty of the transmitting side simply to shorten the excitation period of the transmitting side, a difference develops between pulse widths of the transmitting side and the receiving side causing a circulating current to increase. The circulating current does not contribute to electric power transmission so that an increase in circulating current will cause a drop in transmission efficiency to occur.

Accordingly, the present invention does not simply control to change the duty of the transmitting side but controls to change the duty of the transmitting side and controls to change the half-bridge phase difference of the left arm and the right arm of the primary side conversion circuit and the secondary side conversion circuit so as to control the pulse widths of the transmitting side and the receiving side to be equal and suppress the circulating current.

According to one aspect of the present invention, the control circuit controls changing of the duty of the transmitting side so as to be inversely proportional to the phase difference $\phi$ of the primary side conversion circuit and the secondary side conversion circuit, changing of the half-bridge phase difference of the primary side conversion circuit using the duty of the secondary side conversion circuit, and changing of the half-bridge phase difference of the secondary side conversion circuit using the duty of the primary side conversion circuit.

According to another aspect of the present invention, the control circuit controls changing of a duty $\delta$ of the transmitting side so that $$\delta = K/\phi$$

where K is a constant
with respect to a phase difference $\phi$ of the primary side conversion circuit and the secondary side conversion circuit, and controls changing of the half-bridge phase difference $\gamma 1$ of the primary side conversion circuit using the duty $\delta 2$ of the secondary side conversion circuit so that $$\gamma 1 = 2\pi - \delta 2$$

and controls changing of the half-bridge phase difference γ2 of the secondary side conversion circuit using the duty δ1 of the primary side conversion circuit so that $$\gamma 2=2\pi-\delta 1$$

According to the present invention, particularly during light loading, conversion efficiency can be improved by reducing transformer core loss while suppressing circulating current.

BRIEF DESCRIPTION OF DRAWINGS

FIG. 3A is a waveform diagram of the transformer voltage when only the duty of the secondary side converter circuit is modulated;
FIG. 3B is a waveform diagram of the transformer current when only the duty of the secondary side converter circuit is modulated;
FIG. 5A is a waveform diagram illustrating transformer voltage in the prior art;
FIG. 5B is a waveform diagram illustrating transformer current in the prior art;
FIG. 5C is a waveform diagram illustrating transformer magnetic flux in the prior art;
FIG. 6A is a waveform diagram illustrating transformer voltage in the embodiment.
FIG. 6B is a waveform diagram illustrating transformer current in the embodiment;
FIG. 6C is a waveform diagram illustrating transformer magnetic flux in the embodiment.

DESCRIPTION OF EMBODIMENTS

Embodiments of the present invention will be described hereinafter with reference to the attached drawings.

Figure 1:
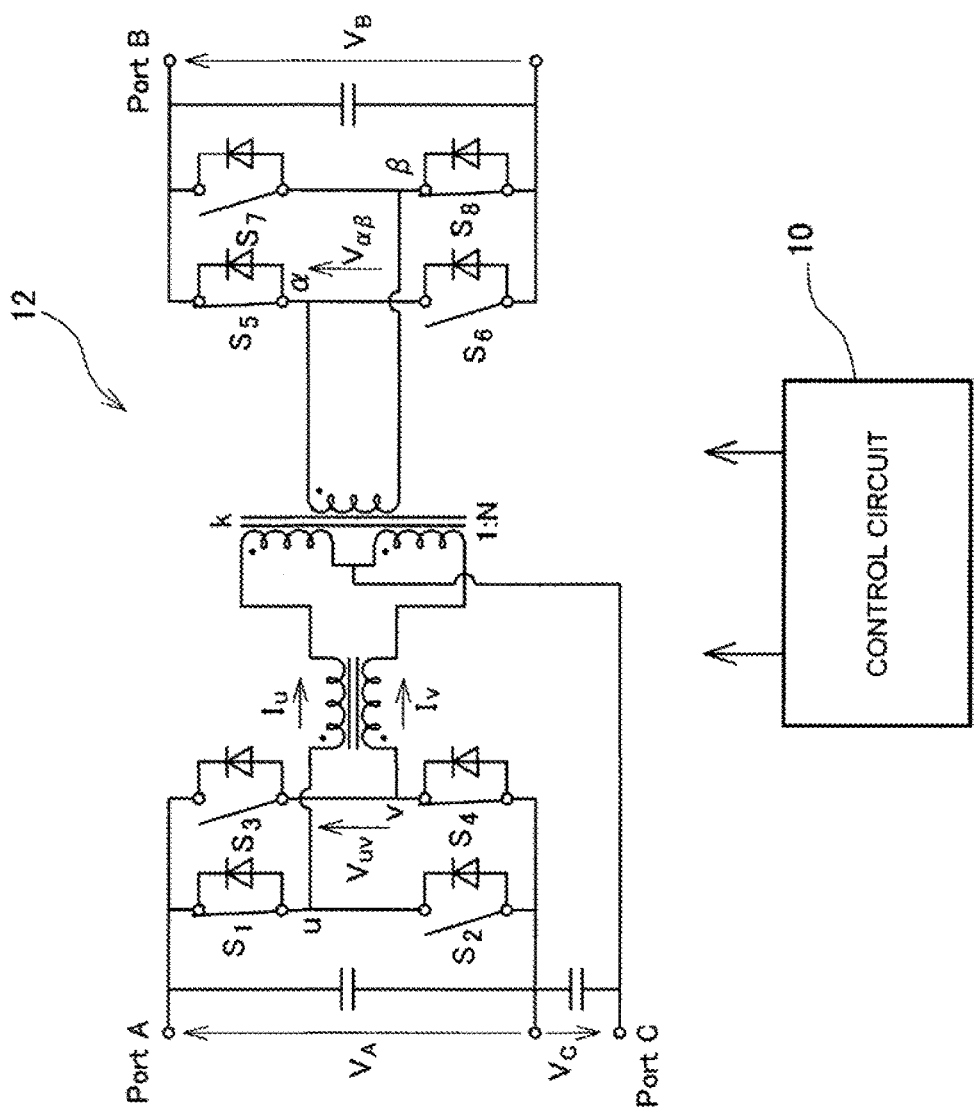
FIG. 1 is a circuit diagram of an embodiment.

FIG. 1 is a circuit diagram of the electric power conversion circuit system relating to the embodiment. The electric power conversion circuit system comprises a control circuit 10 and an electric power conversion circuit 12. The electric power conversion circuit 12 is a 3-port multi-port circuit capable of bidirectional electric power transmission among three DC power supplies by utilizing magnetically coupled reactors.

The multi-port circuit comprises a port A and a port C in a primary side conversion circuit and a port B in a secondary side conversion circuit.

Between a positive bus of the primary side conversion circuit and a negative bus of the primary side conversion circuit are provided a left arm composed of switching transistors S1 and S2 connected in series to each other and a right arm composed of switching transistors S3 and S4 connected in series to each other. The left arm and the right arm are connected in parallel to each other to comprise a full bridge circuit. Port A is arranged between the positive bus and the negative bus of the primary side conversion circuit. The I/O voltage of port A is denoted as VA. Port C is arranged between the negative bus of the primary side conversion circuit and the middle of the transformer. The I/O voltage of port C is denoted as VC.

Between the connecting point of the switching transistors S1 and S2 forming the left arm and the connecting point of the switching transistors S3 and S4 forming the right arm are connected the magnetically coupled reactors connected in series to each other and the primary winding of the transformer. Namely, the magnetically coupled reactors and the primary winding of the transformer are connected to the middle of two bidirectional chopper circuits.

On the other side between the positive bus and the negative bus of the secondary side conversion circuit are provided a left arm composed of switching transistors S5 and S6 connected in series to each other and a right arm composed of switching transistors S7 and S8 connected in series to each other. The left arm and the right arm are connected in parallel to each other to comprise a full bridge circuit. Port B is arranged between the positive bus and the negative bus of the secondary side conversion circuit. The I/O voltage of port B is denoted as VB.

The secondary winding of the transformer is connected between a connecting point of switching transistors S5 and S6 forming the left arm and a connecting point of switching transistors S7 and S8 forming the right arm.

The control circuit 10 sets various parameters for controlling the electric power conversion circuit 12 and performs switching control of switching transistors S1 to S8 of the primary side conversion circuit and the secondary side conversion circuit. On the basis of an external mode signal, the control circuit 10 selects a mode for performing power conversion between two ports of the primary side conversion circuit and a mode for performing isolated electric power transmission between the primary and the secondary. In terms of ports, the circuit between port A and port B operates as a bidirectional isolated converter and the circuit between port A and port C operates as a bidirectional non-isolated converter. At this time, the magnetically coupled reactors perform electric power transmission by employing a leak inductance component to weaken the magnetic flux in the bidirectional isolated converter operation and by employing the sum of an excitation inductance to strengthen the magnetic flux in the bidirectional non-isolated converter operation and the leak inductance component.

The isolated electric power transmission between the primary side conversion circuit and the secondary side conversion circuit is controlled at a phase difference φ of switching periods of switching transistors S1 to S8 of the primary side conversion circuit and the secondary side conversion circuit. When transmitting electric power from the primary side conversion circuit to the secondary side conversion circuit, the phase difference φ is determined so that the primary side has a leading phase with respect to the secondary side. Furthermore, in contrast to this, when transmitting electric power from the secondary side conversion circuit to the primary side conversion circuit, the phase difference φ is determined so that the primary side has a lagging phase with respect to the secondary side. For example, when transmitting electric power from the secondary side conversion circuit to the primary side conversion circuit, the switching transistors S1 and S4 at the primary side conversion circuit are turned on and the switching transistors S2 and S3 are turned off. Furthermore, the switching transistors S5 and S8 at the secondary side conversion circuit are turned on and the switching transistors S6 and S7 are turned off. Current flows at the secondary side conversion circuit:

S5→transformer secondary winding→S8

Current flows at the primary side conversion circuit:

S4→transformer primary winding→S1

In the next period, the switching transistors S1, S4 and S8 are turned on and the other switching transistors are turned off. Compared to the previous period, the switching transistor S5 transitions from on to off, and when the switching transistor 55 of the secondary side conversion circuit turns off, current continues to flow through a diode connected in parallel with the switching transistor S6 and the terminal voltage of the secondary side drops to zero. Therefore, switching on and off the switching transistor S5 determines the terminal voltage of the secondary side.

Furthermore, in the next period, the switching transistors S1, S4, S6, and S8 are turned on and the other switching transistors are turned off.

Furthermore, in the next period, the switching transistors S4, S6, and S8 are turned on and the other switching transistors are turned off. When the switching transistor S1 of the primary side conversion circuit transitions from on to off, current continues to flow through a diode connected in parallel with the switching transistor S1 so that the terminal voltage of the primary side does not become zero provided the switching transistor S2 does not turn on. Therefore, switching on and off the switching transistor S2 determines the terminal voltage of the primary side.

A dead time on the order of several hundred nanoseconds to several microseconds may be provided so that the upper and lower switching transistors are not short-circuited. Namely, a period may be provided where the switching transistors S1 and S2, S3 and S4, S5 and S6, and S7 and S8 both turn off.

When the multi-port circuit of FIG. 1 is mounted, for example, in a hybrid vehicle or the like, connections are possible such as where a 48 V accessory is connected to port A, a 14 V accessory is connected to port C, and a main battery is connected to port B.

Figure 2:
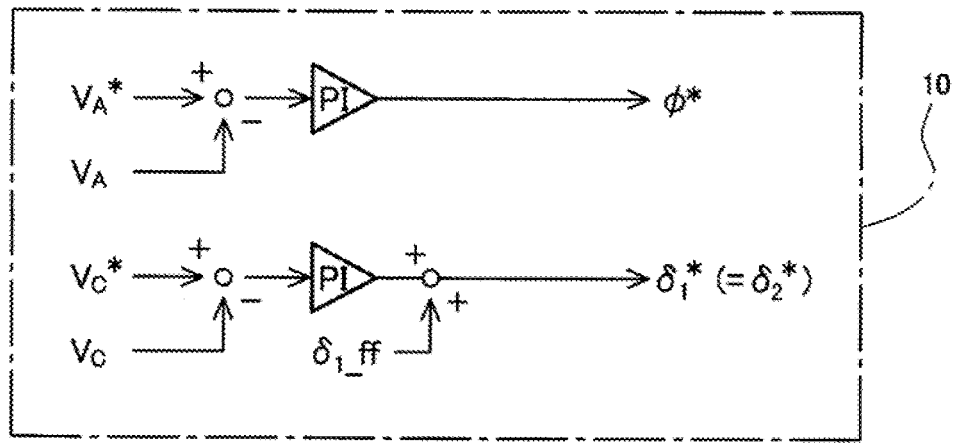
FIG. 2 is a basic control block diagram presumed in the preferred embodiment.

FIG. 2 is a basic block diagram of the control circuit 10 presumed in the embodiment. With the primary side conversion circuit receiving electric power and the secondary side conversion circuit transmitting power, when transmitting electric power from port B provided with a power supply of voltage value VB to port A and port C, control is possible if the voltage reference values VA and VC of port A and port C, respectively, are detected.

The control circuit 10 includes as functional blocks a phase difference command value φ* generator and a duty command value δ* generator.

The phase difference command value φ* generator includes a differential unit and a PI (proportional integral) control unit. The differential unit calculates the difference between a voltage command value VA* and reference value VA of port A. The PI control unit performs PI control on the calculated difference value and generates a phase difference command value φ* for the primary side conversion circuit and the secondary side conversion circuit. The phase difference φ of the primary side conversion circuit and the secondary side conversion circuit is controlled by the generated phase difference command value φ* so that the output voltage value of port A can be maintained to be constant.

Furthermore, the duty command value δ* generator includes a differential unit, a PI control unit, and an adder. The differential unit calculates the difference between a voltage command value VC* and the reference value VC of port C. The PI control unit performs PI control on the calculated differential value. The adder adds a feed-forward item δFF to the PI control value and generates a duty command value δ* for the primary side conversion circuit and the secondary side conversion circuit. In the figure, δ1* is the duty of the primary side conversion circuit and is equal to the duty δ2* of the secondary side conversion circuit. The duty is controlled by the generated duty command value δ* so that the output voltage value of port C can be maintained to be constant. It should be noted that although the feed-forward item δFF has been added to stabilize control and is, for example, determined using:

$$\delta FF=2\pi(1-VC/VA)$$

it is not absolutely necessary in the embodiment.

In actual driving of a hybrid vehicle or the like, the output voltage is most often used at a light load of 50 W to 150 W so an efficiency increase at such a light load is necessary for fuel economy improvement. When the output voltage is at a light load of 50 W to 150 W, the load current flowing to the circuit is small so that core loss of the transformer becomes dominant compared to device loss or winding copper loss. The core loss of the transformer depends on operating frequency, core volume, and maximum magnetic flux, of which the frequency and the core volume are parameters determined during circuit design and cannot be changed. Accordingly, designing for a reduction of a maximum magnetic flux Bm during light loading is effective.

The maximum magnetic flux of the transformer is given in the following formula:

$$Bm=T\cdot VB/(2N\cdot A_T)$$

where N represents number of windings, $A_T$ represents cross sectional area, and T represents excitation period. Values N and AT are design values so they cannot be changed by control. Therefore, the only parameter that can be controlled is the excitation period T. The excitation period T is a period when the voltage VB is applied to the transmitting side winding of the transformer and is given by the following formula from operating frequency $\omega_{sw}$.

$$T=(|\delta 2-\pi|+\pi)/\omega_{sw}$$

where δ2 is the duty in radian notation of the secondary side conversion circuit, which is the transmitting side, and 0<δ2<2π. It is clear from this formula that separating the duty δ2 of the secondary side conversion circuit, which is the transmitting side, from the value of π enables the excitation period T to be shortened and the maximum magnetic flux to be reduced.

However, when only the duty of the secondary side conversion circuit is changed, a difference between the duty of the primary side conversion circuit and of the secondary side conversion circuit develops causing a difference to develop in the voltage waveform applied to both sides of the transformer windings and a circulating current to develop.

FIG. 3A and FIG. 3B are waveform diagrams of the transformer voltage and current when the duty of the primary side conversion circuit and of the secondary side conversion circuit differ. FIG. 3A shows transformer voltage waveforms of voltage 6×V1 of the primary side conversion circuit and voltage V2 of the secondary side conversion circuit. FIG. 3B is a waveform diagram for transformer current when the duty δ1 of the primary side conversion circuit is 0.75 and the duty δ2 of the secondary side conversion circuit is 0.6. As shown in FIG. 3A, when the duty of the primary side conversion circuit and of the secondary side conversion circuit differ, a difference develops in the pulse widths. Thus, as shown in FIG. 3B, where the transformer current should originally be zero in a non-transmission period, a transformer current, namely, circulating current, flows even in the non-transmission period. The circulating current flows, for example, S2→S4→reactor→transformer primary winding→reactor→S2 and circulates in a closed circuit without contributing to electric power transmission when the switching transistor S2 is on and is a factor causing the conversion efficiency to substantially deteriorate.

Thus, in the embodiment, half-bridge phase differences $\gamma 1$, $\gamma 2$ of the primary side conversion circuit and the secondary side conversion circuit, respectively, are changed to match the change in the duty of the secondary side conversion circuit to suppress the generation of circulating current and to shorten the excitation period T for the purpose of reducing the maximum magnetic flux of the transformer.

The half-bridge phase difference is the phase difference between the left arm (phase U) and the right arm (phase V) in the primary side conversion circuit and the secondary side conversion circuit, respectively. When phase U and phase V of the primary side conversion circuit are represented as a phase U1 and a phase V1, respectively, and when phase U and phase V of the secondary side conversion circuit are represented as a phase U2 and a phase V2 of the secondary side conversion circuit, respectively, the half-bridge phase difference $\gamma 1$ is the phase difference between phase U1 and phase V1, and the half-bridge phase difference $\gamma 2$ is the phase difference between phase U2 and phase V2. Although the half-bridge phase differences $\gamma 1$ and $\gamma 2$ are basically the same, taking into consideration $\delta 1$ and $\delta 2$ differ in the embodiment, the half-bridge phase differences $\gamma 1$ and $\gamma 2$ are set to different values so that the pulse widths of voltages V1 and V2 of the primary side conversion circuit and the secondary side conversion circuit are equal.

Figure 4:
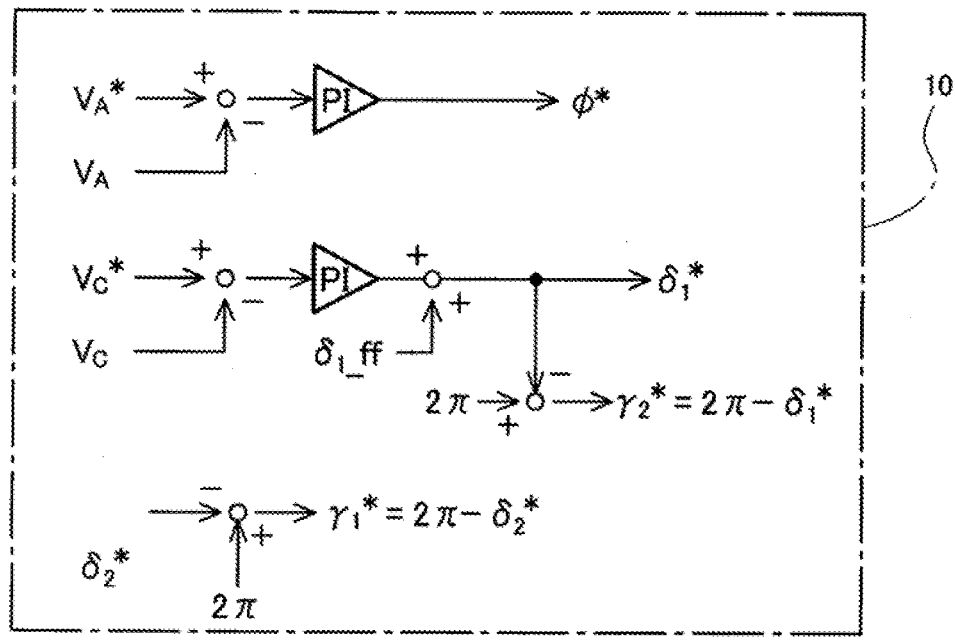
FIG. 4 is a control block diagram of the embodiment.

FIG. 4 is a functional block diagram of the control circuit 10 in the embodiment. Compared to the presumed basic functional block diagram shown in FIG. 2, half-bridge phase difference command values $\gamma 1^*$ and $\gamma 2^*$ of the primary side conversion circuit and the secondary side conversion circuit are generated from the duty of the bridge circuit on the opposite side from each other. Namely, the half-bridge phase difference $\gamma 1^*$ of the primary side conversion circuit is generated from the duty command value $\delta 2^*$ of the secondary side conversion circuit and the half-bridge phase difference $\gamma 2^*$ of the secondary side conversion circuit is generated from the duty command value $\delta 1^*$ of the primary side conversion circuit More specifically, the phase difference command value $\phi^*$ is generated from the voltage command value VA* and the reference value VA of port A similar to the case of FIG. 2 and the duty command value $\delta 1^*$ of the primary side conversion circuit is generated from the voltage command value VC* and the reference value VC of port C and the feed forward item $\delta$FF (although this is not essential) similar to the case of FIG. 2

On the other hand, during light loading, the duty command value $\delta 2^*$ of the secondary side conversion circuit is separated from the value of $\pi$ as described above so that by changing from $\delta 1^*$ the excitation period T is shortened and the half-bridge phase difference command value $\gamma 1^*$ is generated from the duty command value $\delta 2^*$ of the secondary side conversion circuit using $\gamma 1^* = 2\pi - \delta 2^*$ and the half-bridge phase difference command value $\gamma 2^*$ of the secondary side conversion circuit is generated from the duty command value $\delta 1^*$ of the primary side conversion circuit using $\gamma 2^* = 2\pi - \delta 1^*$ More specifically, the duty command value $\delta 2^*$ of the secondary side conversion circuit, which is the transmitting side, is generated using $\delta 2^* = K/\phi^*$ This signifies control for changing the duty command value $\delta 2^*$ of the secondary side conversion circuit so as to be inversely proportional to the phase difference $\phi$, where K is a constant and $\delta 2^* > \delta 1^*$.

During light loading, along with a drop in transmission electric power, namely, a drop in phase difference $\phi$, the duty command value $\delta 2^*$ of the secondary side conversion circuit increases and the excitation period T shortens so that the maximum magnetic flux decreases.

FIG. 5A, 5B, and 5C are waveform diagrams of transformer voltage, transformer current, and transformer magnetic flux when the configuration of the control circuit 10 is as shown in FIG. 2. FIG. 5A shows the transformer voltage, FIG. 5B shows the transformer current, and FIG. 5C shows the transformer magnetic flux.

Furthermore, FIG. 6A, 6B, and 6C are waveform diagrams of transformer voltage, transformer current, and transformer magnetic flux when the configuration of the control circuit 10 is as shown in FIG. 4. FIG. 6A shows the transformer voltage, FIG. 6B shows the transformer current, and FIG. 6C shows the transformer magnetic flux. All are circuit simulation results.

Taking notice of the transformer current and the transformer magnetic flux in FIG. 5B and 5C and FIG. 6B and 6C, the transformer magnetic flux in FIG. 6C compared to FIG. 5C reduces from 200 mT to 160 mT, and the circulating current is suppressed to the vicinity of zero as shown in FIG. 6B.

Figure 7:
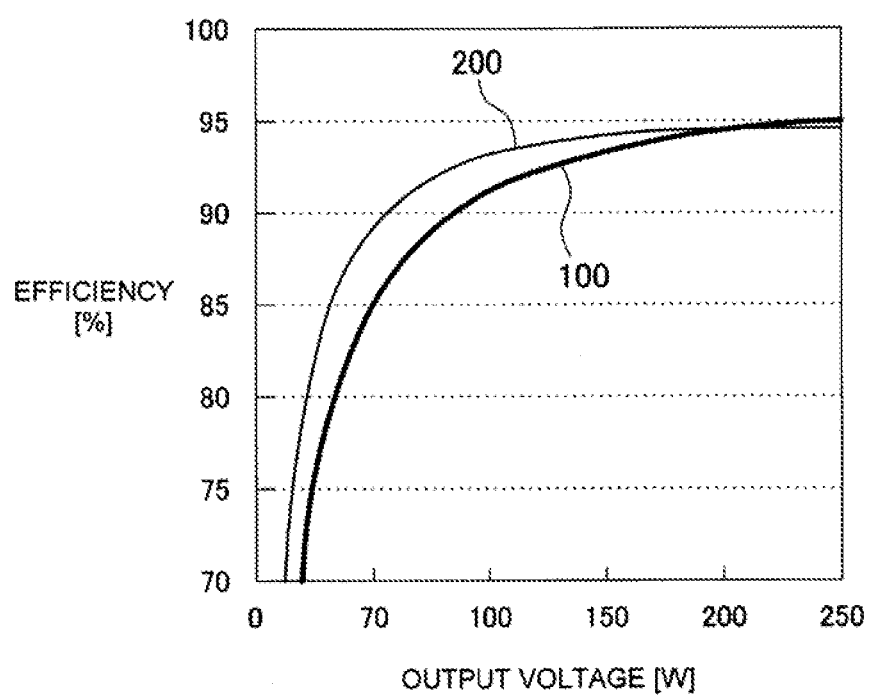
FIG. 7 is an efficiency diagram for the embodiment.

FIG. 7 shows circuit simulation results of efficiency with respect to output electric power when the configuration of the control circuit 10 is as shown in FIG. 2 and in FIG. 4. In the figure, a reference numeral 100 is the efficiency in the case of FIG. 2, namely, when the duty of the secondary side conversion circuit is not controlled to change and the half-bridge phase differences $\gamma 1$ and $\gamma 2$ are also not controlled to change, and a reference numeral 200 is the efficiency in the case of FIG. 4, namely, when the duty of the secondary side conversion circuit and the half-bridge phase differences $\gamma 1$ and $\gamma 2$ are controlled to change. In the embodiment, the circulating current can be suppressed, the amount by which the efficiency improves, and the effect is particularly prominent when the output electric power is small at 50 W to 150 W.

As described above, in the embodiment, where efficiency improvement is necessary at light loads (50 W to 150 W) in a hybrid vehicle, both the duty and the half-bridge phase difference are controlled so that transformer core loss can be reduced while the circulating current is suppressed, and the efficiency can be improved.

In the embodiment, changing the duty of the secondary side conversion circuit, which is the transmitting side, and changing the half-bridge phase difference $\gamma 1$ of the primary side conversion circuit reduce the maximum magnetic flux and suppress the circulating current. However, besides performing control at the control block of the embodiment shown in FIG. 4 during either high loading (150 W or higher) or light loading (50 W to 150 W), the control may be switched according to load, such as performing control at the basic control block shown in FIG. 2 during high loading, performing control at the control block of the embodiment shown in FIG. 4 during light loading, and so forth.

Furthermore, although transmitting electric power from the secondary side conversion circuit to the primary side conversion circuit was described, needless to say, the embodiment can also be applied to transmitting electric power from the primary side conversion circuit to the secondary side conversion circuit. In this case, the duty $\delta 1$ of the primary side conversion circuit, which is the transmitting side, is set so as to be inversely proportional to the phase difference φ and the half-bridge phase difference γ1 is set from the duty δ2 of the secondary side conversion circuit and γ2 is set from the duty δ1 of the primary side conversion circuit. Namely, when the transmitting side is the primary side conversion circuit and the receiving side is the secondary side conversion circuit, the duty command value δ1* and the half-bridge phase difference command values γ1 and γ2 may be generated using:

$\gamma1^* = 2\pi - \delta2^*$ $\gamma2^* = 2\pi - \delta1^*$ $\delta1^* = K/\phi^*$ While there has been described what are at present considered to be preferred embodiments of the invention, it will be understood that various modifications may be made thereto, and it is intended that the appended claims cover all such modifications as fall within the true spirit and scope of the invention.

The invention claimed is:

1. An electric power conversion circuit system comprising:
   a primary side conversion circuit comprising a left arm and a right arm between a primary side positive bus and a primary side negative bus, wherein said left arm and said right arm are respectively composed of two switching transistors connected in series, and a primary side winding of a transformer is connected to between a connecting point of the two switching transistors of said left arm and a connecting point of the two switching transistors of said right arm;
   a secondary side conversion circuit comprising a left arm and a right arm between a secondary side positive bus and a secondary side negative bus, wherein said left arm and said right arm are respectively composed of two switching transistors connected in series, and a secondary side winding of said transformer is connected to between a connecting point of the two switching transistors of said left arm and a connecting point of the two switching transistors of said right arm; and
   a control circuit for controlling switching of said switching transistors of said primary side conversion circuit and said secondary side conversion circuit; wherein
   said control circuit controls, when an output voltage is at a relatively light loading, changing of a duty of a transmitting side among said primary side conversion circuit and said secondary side conversion circuit, and changing of a half-bridge phase difference of said left arm and said right arm of said primary side conversion circuit and said secondary side conversion circuit.

2. The electric power conversion circuit system according to claim 1, wherein:
   said control circuit controls changing of the duty of said transmitting side so as to be inversely proportional with respect to a phase difference φ of said primary side conversion circuit and said secondary side conversion circuit and changing of said half-bridge phase difference of said primary side conversion circuit using the duty of said secondary side conversion circuit and changing of said half-bridge phase difference of said secondary side conversion circuit using the duty of said primary side conversion circuit.

3. The electric power conversion circuit system according to claim 2, wherein:
   said control circuit controls changing of a duty δ of said transmitting side so that $\delta = K/\phi$ where K is a constant
with respect to a phase difference φ of said primary side conversion circuit and said secondary side conversion circuit, and controls changing of said half-bridge phase difference γ1 of said primary side conversion circuit using the duty δ2 of said secondary side conversion circuit so that $\gamma1 = 2\pi - \delta2$ and controls changing of said half-bridge phase difference γ2 of said secondary side conversion circuit using the duty δ1 of said primary side conversion circuit so that $\gamma2 = 2\pi - \delta1$.

* * * * *